United States Patent
Kitawaki et al.

(10) Patent No.: US 12,394,440 B2
(45) Date of Patent: Aug. 19, 2025

(54) MAGNETIC DISK DEVICE AND METHOD FOR MANUFACTURING MAGNETIC DISK DEVICE

(71) Applicants: UACJ CORPORATION, Tokyo (JP); FURUKAWA ELECTRIC CO., LTD., Tokyo (JP)

(72) Inventors: Kotaro Kitawaki, Tokyo (JP); Shinpei Todo, Tokyo (JP); Ryohei Yamada, Tokyo (JP); Hideyuki Hatakeyama, Tokyo (JP)

(73) Assignees: UACJ CORPORATION, Tokyo (JP); FURUKAWA ELECTRIC CO., LTD, Tokyo (JP)

( * ) Notice: Subject to any disclaimer, the term of this patent is extended or adjusted under 35 U.S.C. 154(b) by 0 days.

(21) Appl. No.: 18/547,728

(22) PCT Filed: Feb. 28, 2022

(86) PCT No.: PCT/JP2022/008147
§ 371 (c)(1),
(2) Date: Aug. 24, 2023

(87) PCT Pub. No.: WO2022/196314
PCT Pub. Date: Sep. 22, 2022

(65) Prior Publication Data
US 2024/0135971 A1    Apr. 25, 2024
US 2024/0233766 A9    Jul. 11, 2024

(30) Foreign Application Priority Data
Mar. 19, 2021 (JP) .................................. 2021-046121

(51) Int. Cl.
*G11B 19/20* (2006.01)
(52) U.S. Cl.
CPC ................. *G11B 19/2045* (2013.01)

(58) Field of Classification Search
None
See application file for complete search history.

(56) References Cited

U.S. PATENT DOCUMENTS 4,796,141 A * 1/1989 Tsumura ............ G11B 33/1433
5,659,443 A * 8/1997 Berberich ............ G11B 17/038
                                                     360/98.06
(Continued)

FOREIGN PATENT DOCUMENTS

JP     2007185035 A  *  7/2007
JP     2008276942 A     11/2008
(Continued)

OTHER PUBLICATIONS

"Production of glass plate, the glass plate method for chamfering, and production of magnetic disk," Translation of WO2020111282 A1, published Nov. 4, 2021. (Year: 2021).*
(Continued)

*Primary Examiner* — William J Klimowicz
(74) *Attorney, Agent, or Firm* — Greer Burns & Crain Ltd.

(57) ABSTRACT

A magnetic disk device includes a plurality of disk-shaped magnetic disks 30, spacers 80, a hub 90, a clamp 70, and a fastening member 72. Each of the magnetic disks 30 includes a through-hole in a center section thereof. Each of the spacers 80 includes a through-hole in a center section thereof, and is disposed among the magnetic disks 30. The hub 90 is inserted into the through-holes of the magnetic disks 30 and the spacers 80. The clamp 70 presses and holds the magnetic disks 30 and the spacers 80. The fastening member 72 fastens the clamp 70 to the hub 90. The clamp 70 is fastened to the hub by the fastening member 72 with a torque of from 5 cN·m to 45 cN·m.

11 Claims, 6 Drawing Sheets

(56) References Cited

U.S. PATENT DOCUMENTS

| | | | | |
|---|---|---|---|---|
| 5,982,581 | A * | 11/1999 | Kazmierczak | G11B 17/0284 360/99.12 |
| 6,212,030 | B1 * | 4/2001 | Koriyama | G11B 25/043 |
| 6,255,750 | B1 * | 7/2001 | Mohajerani | G11B 19/2009 360/99.18 |
| 7,209,320 | B1 * | 4/2007 | Woods | G11B 17/038 |
| 2003/0227712 | A1 * | 12/2003 | Nakano | G11B 25/043 360/99.08 |
| 2010/0014190 | A1 | 1/2010 | Kohei et al. | |
| 2010/0232060 | A1 * | 9/2010 | Hanlon | G11B 17/0287 360/98.08 |
| 2010/0238585 | A1 * | 9/2010 | Kang | G11B 5/6005 360/75 |
| 2019/0066724 | A1 | 2/2019 | Nakamura et al. | |
| 2019/0172487 | A1 | 6/2019 | Kitawaki et al. | |
| 2022/0089479 | A1 * | 3/2022 | Azuma | G11B 5/73 |
| 2023/0110894 | A1 * | 4/2023 | Suzuki | G11B 5/012 360/135 |
| 2023/0368815 | A1 * | 11/2023 | Takano | G11B 5/82 |

FOREIGN PATENT DOCUMENTS

| | | | |
|---|---|---|---|
| JP | 2009054254 A | 3/2009 | |
| JP | 2009099251 A | 5/2009 | |
| JP | 2010211909 A | 9/2010 | |
| KR | 100251949 B1 * | 4/2000 | ........... G11B 17/038 |
| WO | 2008139537 A1 | 11/2008 | |
| WO | 2011096310 A1 | 8/2011 | |
| WO | 2017188320 A1 | 11/2017 | |
| WO | 2018025769 A1 | 2/2018 | |
| WO | 2020111282 A1 | 6/2020 | |

OTHER PUBLICATIONS

ISR issued in PCT/JP2022/008147, mailed May 17, 2022.
Written opinion of the ISA, mailed May 17, 2022.
Office Action issued in corresponding Japanese patent application No. 2023-506930, dated Oct. 22, 2024.

* cited by examiner

MAGNETIC DISK DEVICE AND METHOD FOR MANUFACTURING MAGNETIC DISK DEVICE

TECHNICAL FIELD

The present disclosure relates to a magnetic disk device and a method for manufacturing the magnetic disk device.

BACKGROUND ART

The amount of data used by individuals has increased due to the spread of smartphones and smart household appliances. This enormous amount of data is sent over the internet and stored in magnetic disk devices (hard disk drives, HDD) in data centers. There is a need for magnetic disk devices that have increased capacity in order to store this enormous amount of data.

For example, Patent Literature 1 describes a substrate for a magnetic recording medium in which, in order to reduce the thickness of a housing that accommodates the magnetic recording medium, a portion, that is a predetermined distance from an inner circumferential edge of at least one side of a disk-like resin substrate including a through-hole at a center thereof, has a shape that is thicker than a portion outside the predetermined distance.

CITATION LIST

Patent Literature

Patent Literature 1: Unexamined Japanese Patent Application Publication No. 2009-54254

SUMMARY OF INVENTION

Technical Problem

One example for increasing the capacity of a magnetic disk device is the technological trend of increasing the number of magnetic disks mounted in the magnetic disk device and expanding the data area per each magnetic disk device. However, the dimensions of magnetic disk devices are defined by standards and, as such, modifications such as reducing the thickness of the magnetic disks are required to increase the number of mounted magnetic disks. When the thickness of the magnetic disk is reduced, rigidity declines and impact resistance declines. For example, the magnetic disk is more likely to deform when subjected to an impact such as when the HDD is dropped. That is, there is a trade-off relationship between increasing the capacity of the magnetic disk device and the impact resistance of the magnetic disk device.

The present disclosure is made with the view of this type of situation, and an objective of the present disclosure is to provide a magnetic disk device that has excellent impact resistance and high data capacity, and a method for manufacturing the magnetic disk device.

Solution to Problem

In order to achieve the objective described above, a magnetic disk device according to a first aspect of the present disclosure includes:

a plurality of disk-shaped magnetic disks, each including a through-hole in a center section thereof;
a spacer that is disposed among the magnetic disks and that includes a through-hole in a center section thereof;
a hub inserted into the through-holes of the magnetic disks and the spacer;
a clamp pressing and holding the magnetic disks and the spacer; and
a fastening member that fastens the clamp to the hub, wherein
the clamp is fastened to the hub by the fastening member with a torque of from 5 cN·m to 45 cN·m.

It is preferable that the clamp is fastened to the hub by the fastening member with a torque of from 20 cN·m to 45 cN·m.

It is preferable that the clamp is fastened to the hub by the fastening member with a torque of from 20 cN·m to 35 cN·m.

It is preferable that each of the magnetic disks has a size of an inner diameter of 25 mm, an outer diameter of from 95 mm to 97 mm, and a thickness of 0.35 mm to 0.635 mm, the spacer has a size of an inner diameter of 25 mm, an outer diameter of from 32 mm to 33 mm, and a thickness of from 1.6 mm to 1.8 mm, and a distance from a center of the fastening member to a protrusion center provided on the clamp is 5 mm.

It is preferable that a first contact length in a radial direction of the magnetic disks and the clamp is greater than or equal to one-half of a second contact length in the radial direction of the magnetic disks and the spacer.

It is preferable that a plurality of the spacer is stacked and layered between the magnetic disks.

It is preferable that a plurality of the spacer is stacked and layered between a magnetic disk, of the magnetic disks, contacting the clamp and a magnetic disk adjacent to the magnetic disk.

It is preferable that each of the magnetic disks has a thickness of 0.48 mm or less.

It is preferable that each of the magnetic disks has a thickness of 0.36 mm or less.

In order to achieve the objective described above, a method for manufacturing a magnetic disk device according to a second aspect of the present disclosure that achieves the objective described above, the magnetic disk device including a plurality of disk-shaped magnetic disks, each including a through-hole in a center section thereof, a spacer that is disposed among the magnetic disks and that includes a through-hole in a center section thereof, a hub inserted into the through-holes of the magnetic disks and the spacer, a clamp pressing and holding the magnetic disks and the spacer, and a fastening member that fastens the clamp to the hub, includes:

fastening the clamp to the hub by the fastening member with a torque of from 5 cN·m to 45 cN·m.

Advantageous Effects of Invention

According to the present disclosure, a magnetic disk device can be provided that has excellent impact resistance and high data capacity.

DESCRIPTION OF EMBODIMENTS

In the following, a magnetic disk device (hard disk drive, HDD) according to various embodiments of the present disclosure is described while referencing the drawings.

Figure 1A:
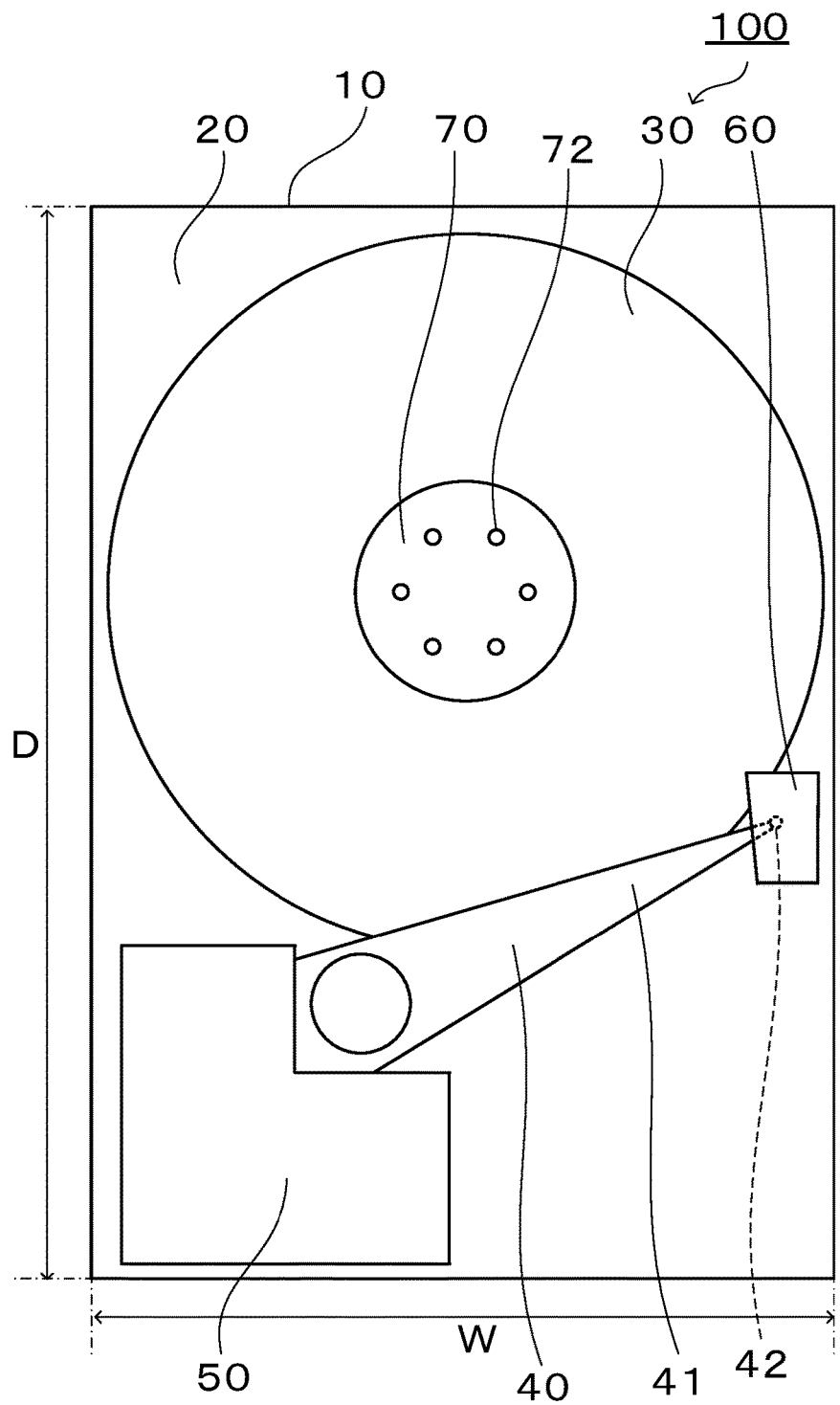
FIG. 1A is a top view illustrating a magnetic disk device according to an embodiment.
Figure 1B:
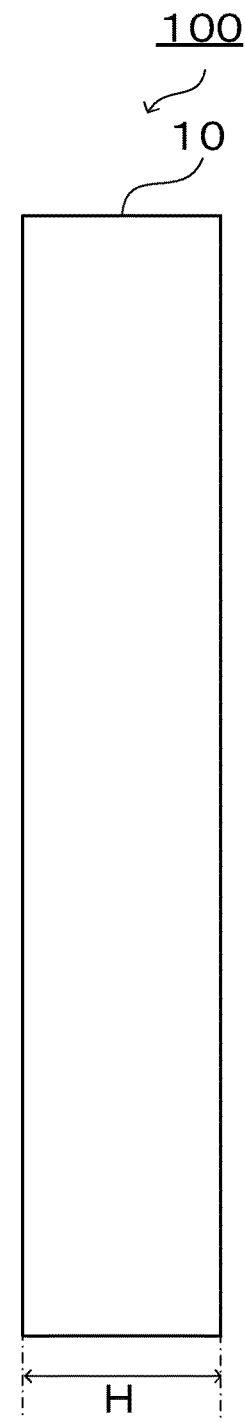
FIG. 1B is a side view illustrating the magnetic disk device.
Figure 2:
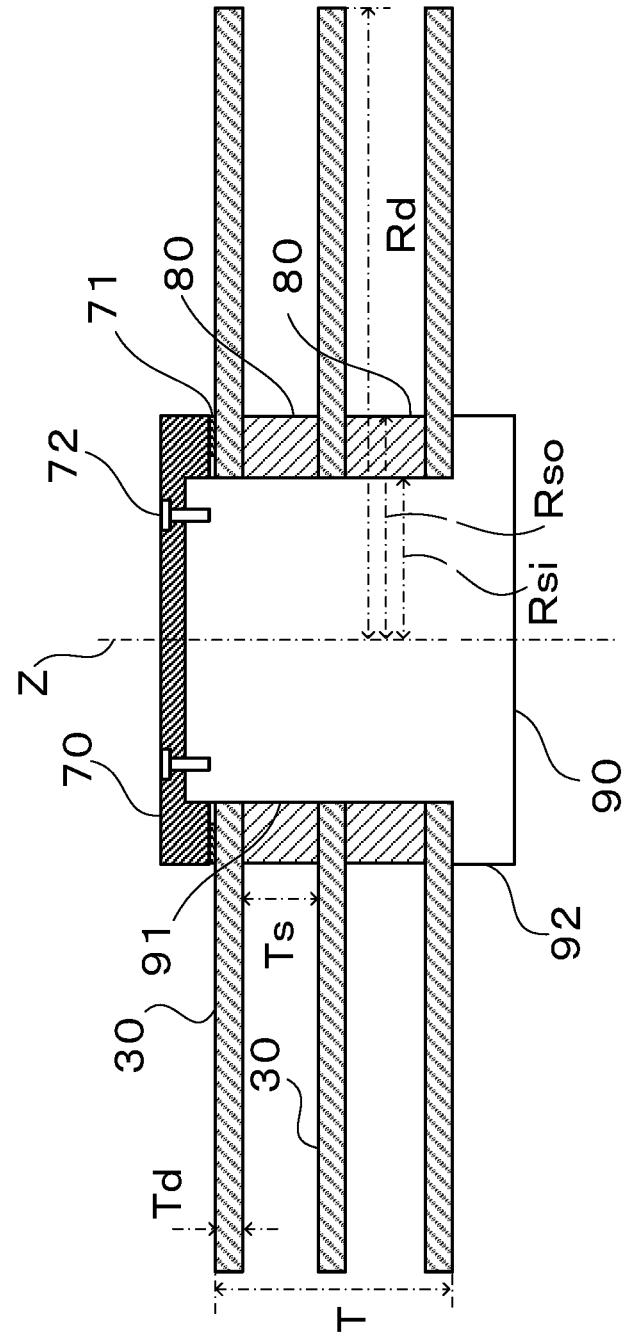
FIG. 2 is a cross-sectional view illustrating magnetic disks and spacers of the magnetic disk device according to the embodiment.
Figure 3:
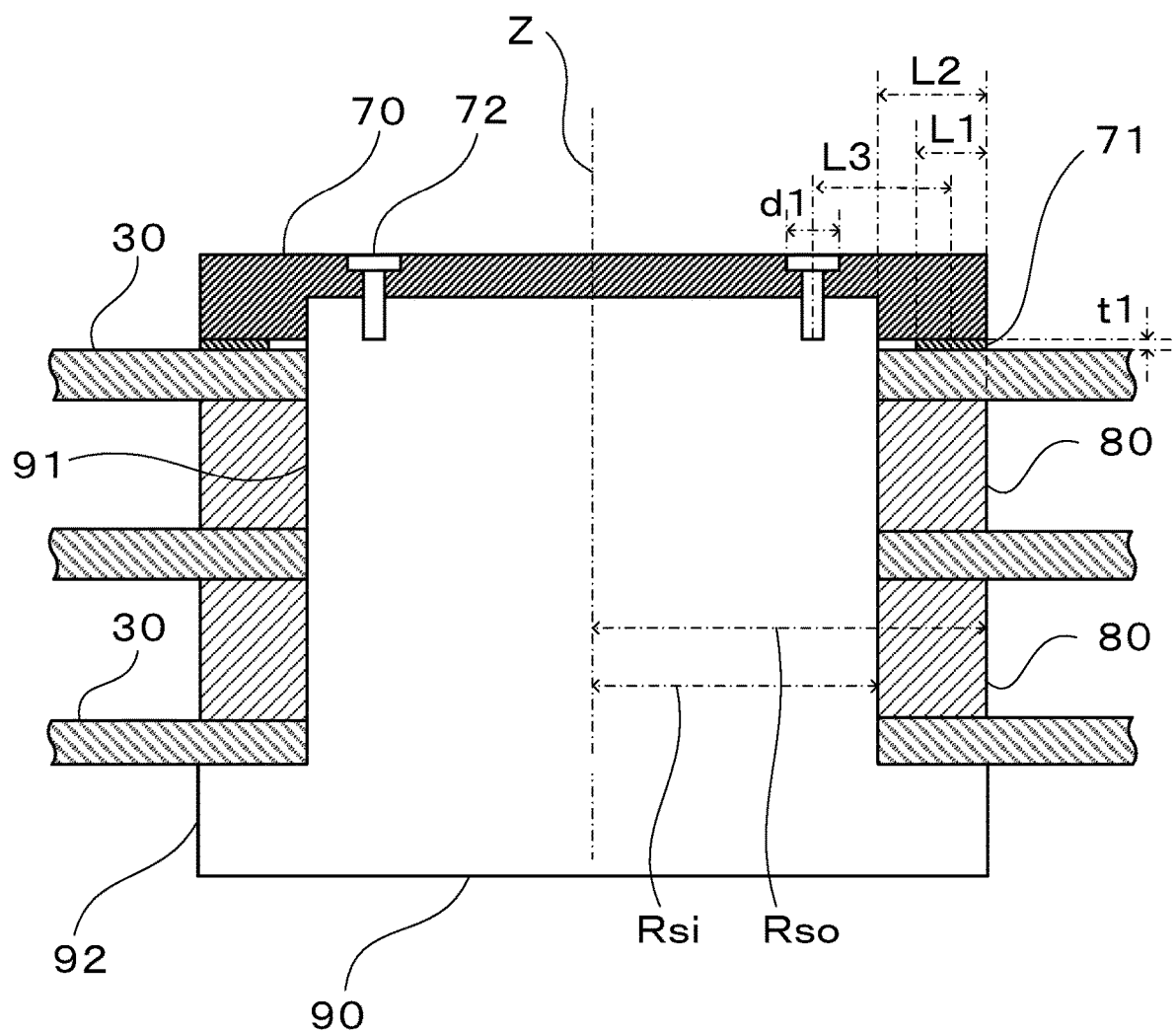
FIG. 3 is an enlarged cross-sectional view illustrating the magnetic disks and the spacers of the magnetic disk device according to the embodiment.

A magnetic disk device 100 of the present embodiment is a box-type recording/playback device and, as illustrated in FIGS. 1A and 1B, includes a housing 10, a base 20, a plurality of magnetic disks 30 that are stacked and disposed, a head stack assembly 40, a voice coil motor 50, a load/unload ramp 60, a clamp 70, and non-illustrated necessary members such as a spindle motor, a circuit board, and the like. Additionally, as illustrated in FIGS. 2 and 3, the magnetic disk device 100 includes a plurality of spacers 80 disposed among the plurality of magnetic disks 30, and a hub 90 that rotates the plurality of magnetic disks 30 around a rotational axis Z.

Returning to FIG. 1, the dimensions of the magnetic disk device 100 are set by common standards. For example, a 3.5 inch magnetic disk device having dimensions complying with SFF-8301 standards are preferably used in data centers. In these standards, a height H of the housing 10 is set to 26.1 mm, a width W is set to 101.6 mm, and a depth D is set to 147 mm.

The housing 10 is typically made from a metal, and has a cubic box shape in which one face is open. The base 20, the magnetic disks 30, the head stack assembly 40, the voice coil motor 50, the load/unload ramp 60, the clamp 70, and the necessary members such as the spindle motor, the circuit board, and the like are sealed in the housing 10 by a non-illustrated top cover.

The base 20 is disposed on the bottom of the housing 10 and is a portion on which the voice coil motor 50, the spindle motor, the circuit board, and the like are mounted. In many cases, the base 20 and the housing 10 are integrated.

As illustrated in FIGS. 2 and 3, the magnetic disks 30 are disk-shaped media that are for magnetically recording information and that have a through hole in a center section thereof. Each of the magnetic disks 30 includes a substrate, an underlayer, a magnetic layer, a protective layer, and a lubricant layer. The magnetic disks 30 rotate around the rotational axis Z. Perpendicular magnetic recording (PMR), or shingled magnetic recording (SMR) is preferably used as the magnetic recording method. In order to realize even higher capacity, technologies such as heat assisted magnetic recording (HAMR) and microwave assisted magnetic recording (MAMR) have been developed. An aluminum alloy substrate or a glass substrate is preferably used as the substrate. The aluminum alloy substrate and the glass substrate are described later in detail.

A thickness Td of each of the magnetic disks 30 is preferably 0.2 mm or greater, and is more preferably 0.35 mm or greater. Additionally, the thickness Td of each of the magnetic disks 30 is 1.75 mm or less, is preferably 0.635 mm or less, is more preferably 0.50 mm or less, is even more preferably 0.48 mm or less, and is yet even more preferably 0.36 mm or less. It is preferable that an outer diameter 2×Rd of each of the magnetic disks 30 is from 95 mm to 97 mm, and an inner diameter is 25 mm. Additionally, a number N of the magnetic disks 30 of the magnetic disk device 100 of the present embodiment is preferably from 8 to 16. One example for increasing the capacity of the magnetic disk device 100 is the technique of increasing the number of mounted magnetic disks 30 and expanding the data area per each magnetic disk device 100. However, as described above, the dimensions of the magnetic disk device 100 are set by standards, and the space for mounting the magnetic disks 30 is limited. As such, the thickness of each of the magnetic disks 30 is reduced in order to increase the number of mounted magnetic disks 30.

Returning to FIG. 1, the head stack assembly 40 includes an arm 41, and a head 42 attached to a tip of the arm 41. When recording using HAMR, a laser element is mounted on the head 42 and, when recording using MAMR, a microwave generating element is mounted on the head 42.

The voice coil motor 50 is a driving motor that rotates the head stack assembly 40.

The load/unload ramp 60 is a component made from resin. The load/unload ramp 60 is mounted at a position closest to the magnetic disks 30 on the outer circumference side of the magnetic disks 30, and is for retracting the head 42 when the magnetic disk device 100 is not in operation.

The clamp 70 is formed from a metal, such as an aluminum alloy or the like, that is not a ferromagnetic material. As illustrated in FIGS. 2 and 3, the clamp 70 includes, on a surface opposing an upper surface of the magnetic disks 30, a protrusion 71 that contacts the uppermost magnetic disk 30 of the magnetic disks 30, and presses, holds, and fixes pluralities of magnetic disks 30 and spacers 80 on the hub 90. The surfaces of the clamp 70 may also be subjected to a coating treatment such as Ni—P plating or the like. The magnetic disks 30 are placed in a fixed state by the clamp 70 due to the protrusion 71 of the clamp 70 press-contacting the upper surface of the uppermost magnetic disk 30 of the magnetic disks 30. An inner diameter side portion of the upper surface of the uppermost magnetic disk 30 of the magnetic disks 30 is clamp-fixed by the protrusion 71 and, as such, separation of the magnetic disks 30 when high-speed rotating and processing data is prevented. The clamp 70 is fixed to the hub 90 by a fastening member 72. In one example, a screw, a hexalobed (hexagonal star) screw, or the like is used as the fastening member 72. A coarse, 0.4 mm pitch or the like is used as the pitch of the fastening member 72. Examples of the material of the fastening member 72 include stainless steel and the like. A first contact length L1 in a radial direction of the magnetic disk 30 and the protrusion 71 is preferably greater than or equal to one-half of second contact length L2 in the radial direction of the magnetic disks 30 and the spacers 80. In the radial direction, a distance L3 from the center of the fastening member 72 fixing the clamp 70 to the center of the protrusion 71 is preferably set to from 4.0 to 6.5 mm. Additionally, a hole diameter d1 of the clamp 70 for inserting the fastening member 72 is preferably set to from 2.0 to 3.5 mm. Moreover, a height t1 of the protrusion 71 is preferably set to from 0.1 to 0.5 mm.

The spacers 80 are ring-shaped thin plates, and are disposed among the plurality of magnetic disks 30. As a result of the spacers 80 being disposed among the magnetic disks 30, the magnetic disks 30 are strongly fixed to the hub 90 of the spindle motor by the clamp 70. The role of the spacers 80 is to secure gaps among the plurality of magnetic disks 30, and to contact and adhere to the magnetic disks 30 to transmit the rotational driving force of the hub 90 to the magnetic disks 30 that do not directly contact the hub 90 or the clamp 70.

Regarding the thickness Ts of each of the spacers 80, it is preferable that the gaps between the magnetic disks 30 are narrow because, in such a case, many magnetic disks 30 can be mounted in the limited space. However, space for operating the head stack assembly 40 is needed on the surfaces of the magnetic disks 30. In particular, in the high capacity technologies of HAMR and MAMR described above, when recording using HAMR, a laser element must be mounted on the head 42 and, when recording using MAMR, a microwave generating element must be mounted on the head 42. Consequently, miniaturization of the head stack assembly 40 is not easy. Each of the gaps among the magnetic disks 30, that is, the thickness Ts of each of the spacers 80, must be at least 1 mm or greater, is preferably 1.5 mm or greater, and is more preferably 1.6 mm or greater. Additionally, the thickness Ts of each of the spacers 80 is preferably 1.8 mm or less so that as many of the magnetic disks 30 as possible can be mounted in the magnetic disk device 100.

Regarding the shape of the spacers 80, it is desirable that the flatness of both sides of each of the spacers 80 is low. Furthermore, it is desirable that chamfering for the purpose of deburring is performed on the front and rear surfaces and inner-outer circumference edge surfaces (hereinafter, spacer inner-outer circumferences) of the spacers 80. This is because, when stacking the magnetic disks 30 and the spacers 80, there is a concern about burrs on the spacer 80 inner-outer circumferences contacting the magnetic disks 30 and causing scratches.

It is desirable that a material that reduces the thermal expansion coefficient difference between the spacers 80 and the magnetic disks 30 is selected as the material of the spacers 80. When the thermal expansion coefficient difference between the magnetic disks 30 and the spacers 80 is great, misalignments between the spacers 80 and the surfaces of the magnetic disk 30 occur when the environmental temperature changes during operation of the magnetic disk device 100, and such misalignments cause read/write errors. When the magnetic disks 30 include aluminum alloy substrates, aluminum is preferably used for the spacers 80. When the magnetic disks 30 include glass substrates, glass, stainless steel, titanium, or the like is preferably used for the spacers 80. Furthermore, it is desirable that the spacers 80 are conductive for the purpose of preventing static charge on the magnetic disks 30 and/or the spacers 80. When glass is used for the spacers 80, it is desirable that a metal film such as Ni—P plating or the like is provided on the front and rear surfaces and the side surface of each of the glass spacers 80.

Next, a case is described in which a plurality of the magnetic disks 30 is mounted in the magnetic disk device 100. As illustrated in FIGS. 2 and 3, Rd is an outer radius of the magnetic disks 30, Td is the thickness of each of the magnetic disks 30, Rso is an outer radius of the spacers 80, Ts is the thickness of each of the spacers 80, and T is a stacked height of the magnetic disks 30 and the spacers 80. The inner diameter of the magnetic disks 30 and the inner diameter of the spacers 80 are equivalent, and an inner radius of the magnetic disks 30 equals an inner radius Rsi of the spacers 80. In one example, the inner diameter of the magnetic disks 30 and an inner diameter 2Rsi of the spacers 80 are 25 mm. Additionally, an outer diameter 2Rso of the spacers 80 is preferably from 32 mm to 33 mm.

Here, a magnetic disk device 100 is considered in which the height H of the housing 10, which is compliant with SFF-8301, is 26.1 mm. When N of the magnetic disks 30, each having the thickness Td, and (N−1) of the spacers 80, each having the thickness Ts are alternately stacked in the magnetic disk device 100, the stacked height T thereof, namely $T = N \times Td + (N-1) \times Ts$, must be lower than 26.1 mm. However, in addition to the magnetic disks 30 and the spacers 80, other components such as the base 20, the circuit board, the spindle motor. the clamp 70, the hub 90, the top cover, and the like are also mounted in the space inside the magnetic disk device 100. As such, the stacked height T of the magnetic disks 30 and the spacers 80 is preferably 20 mm or less, and is more preferably 19 mm or less. As described above, a lower limit value of the thickness Td of each of the magnetic disks 30 is 0.3 mm, a lower limit value of the thickness Ts of each of the spacers 80 is 1 mm, and an upper limit value of the stacked height T of the magnetic disks 30 and the spacers 80 is 20 mm. As such, an upper limit value of the number N of magnetic disks 30 is 16. Additionally, in order to realize high capacity of the magnetic disk device 100, the number N of the magnetic disks 30 is preferably 8 or greater.

The hub 90 is formed from a metal, such as an aluminum alloy or the like, that is not a ferromagnetic material, has a shape in which a small diameter section 91 and a large diameter section 92, which have cylindrical shapes, are connected in the direction of the rotational axis Z, and is rotated by the spindle motor with the rotational axis Z as a center axis. A diameter of the small diameter section 91 is the same as the inner diameter of the magnetic disks 30 and the inner diameter 2Rsi of the spacers 80. The large diameter section 92 and the clamp 70 sandwich and fix the magnetic disks 30 and the spacers 80.

As described above, the magnetic disks 30 are disk-shaped media for magnetically recording information, and each include a substrate, an underlayer, a magnetic layer, a protective layer, and a lubricant layer. An aluminum alloy substrate or a glass substrate is preferably used as the substrate.

Aluminum Alloy Substrate

A conventionally used Al—Mg alloy such as JIS5086 alloy or the like, which has high strength, is preferably used for the aluminum alloy substrate. Alternatively, an Al—Fe alloy, which has high rigidity, is preferably used for the aluminum alloy substrate.

Specifically, the Al—Mg alloy is an aluminum alloy that contains from 1.0 to 6.5 mass % of Mg; further contains one or two or more of 0.070 mass % or less of Cu, 0.60 mass % or less of Zn, 0.50 mass % or less of Fe, 0.50 mass % or less of Si, 0.20 mass % or less of Cr, 0.50 mass % or less of Mn, and 0.20 mass % or less of Zr; and in which the balance consists of aluminum, unavoidable impurities, and other trace elements. Examples of the other trace elements include Be, Sr, and the like and, provided that the content of each trace element is 0.1 mass % or less, these trace elements do not inhibit the effects of the present disclosure.

The Al—Fe alloy is an aluminum alloy that contains Fe, which is a required element, and one or two of Mn and Ni, which are selective elements, the sum of the contents of the Fe, Mn, and Ni having a relationship of from 1.00 to 7.00 mass %; further contains one or two or more of 14.0 mass % or less of Si, 0.7 mass % or less of Zn, 1.0 mass % or less of Cu, 3.5 mass % or less of Mg, 0.30 mass % or less of Cr, and 0.20 mass % or less Zr; and in which the balance consists of aluminum, unavoidable impurities, and other trace elements. Examples of the other trace elements include Be, Sr, and the like and, provided that the content of each trace element is 0.1 mass % or less, these trace elements do not inhibit the effects of the present disclosure.

Next, a method for manufacturing the aluminum alloy substrate is described.

Firstly, an ingot is fabricated by a semi-continuous casting method, and the fabricated ingot is hot rolled and cold rolled to fabricate a plate material of a desired thickness. Alternatively, a plate material is fabricated by continuous casting, and the fabricated plate material is cold rolled to fabricate a plate material of a desired thickness. The ingot may be subjected to a heat treatment for the purpose of homogenizing the structure. The plate material may be subjected to a heat treatment prior to the cold rolling, during the cold rolling, and after the cold rolling for the purpose of improving workability and the like.

Next, the plate material fabricated as described above is punched using a press machine, and disk-shaped blanks having desired inner diameter and outer diameter dimensions are fabricated. Then, the blanks are stacked, a load is applied to the stacked blanks, and heat treatment is performed for the purpose of reducing the flatness of the blanks.

Next, the inner diameter section and the outer diameter section of each of the blanks are turned on a lathe, and T-subs having desired inner diameter and outer diameter dimensions and a chamfer of a desired length are fabricated. Furthermore, the surfaces of both sides of each of the blanks may be ground and T-subs having a desired thickness may be fabricated. Furthermore, the T-subs may be subjected to a heat treatment for the purpose of eliminating the machining distortion generated in the material due to the grinding.

Next, the surfaces of both sides of each of the T-subs are ground using a grinding machine, and G-subs of a determined thickness are fabricated. Furthermore, the G-subs may be subjected to a heat treatment for the purpose of eliminating the machining distortion generated in the material due to the grinding.

Next, M-subs are fabricated by forming a plating of a desired thickness on all surfaces, including the front surface, the rear surface, the end surfaces, the side surface, and the chamfer surface, of the G-subs. Firstly, the G-subs are subjected to pre-processing for the purpose of enhancing plating adhesion. Next, plating is performed. Ni—P electroless plating is preferably used as the plating. Furthermore, the M-subs may be subjected to a heat treatment for the purpose of eliminating the internal stress of the Ni—P electroless plating.

Next, the surfaces of both sides of each of the M-subs are polished using a polishing machine, and substrates, that is, aluminum alloy substrates, of a desired thickness are fabricated. The lower limit value of the thickness of the each of the aluminum alloy substrates fabricated by this method is 0.3 mm. This lower limit value is due to the thickness of a component called a carrier that holds the aluminum alloy substrate when polishing on the polishing machine. The thickness of the carrier can be selected as desired provided that it is greater than or equal to the thickness of each workpiece, namely the aluminum alloy substrate. However, when the carrier is excessively thin, strength is insufficient and the carrier breaks during polishing. From the perspective of the strength of the carrier, the thickness of the carrier is preferably 0.3 mm or greater. Therefore, the lower limit value of the thickness of each workpiece, namely the aluminum alloy substrate, is 0.3 mm. Note that a carrier made from a resin such as aramid resin, epoxy resin, or the like is preferably used as the carrier. The carrier may include a fibrous reinforcing material such as carbon fiber, glass fiber, or the like for the purpose of enhancing strength.

Next, the underlayer, the magnetic layer, the protective layer, and the lubricant layer are formed on the front surface and the rear surface of each of the aluminum alloy substrates. Thus, the magnetic disks 30 are obtained.

Glass Substrate

An aluminosilicate glass, which has high hardness, is preferably used for the glass substrate. Specifically, the aluminosilicate glass contains from 55 to 70 mass % of $SiO_2$ as a main component; one or two or more of 25 mass % or less of $Al_2O_3$, 12 mass % or less of $Li_2O$, 12 mass % or less of $Na_2$, 8 mass % or less of $K_2O$, 7 mass % or less of MgO, mass % or less of CaO, 10 mass % or less of $ZrO_2$, and 1 mass % or less of $TiO_2$; and the balance consists of unavoidable impurities and other trace elements.

Next, a method for manufacturing the glass substrate is described.

Firstly, a glass material prepared in a predetermined chemical composition is dissolved, and a direct press method is used to press-mold the molten ingot from both sides to fabricate glass base plates having a desired thickness. The method used to fabricate the glass base plates is not limited to the direct press method, and a float method, a fusion method, a redraw method, or the like may be used.

Next, the glass base plates are cored in an annular shape, and the inner diameter section and the outer diameter section are polished. Thus, annular glass plates having desired inner diameter and outer diameter dimensions and a desired chamfer length are obtained.

Next, the surfaces of both sides of each of the annular glass plates are ground using a grinding machine, and annular glass substrates having a desired thickness and flatness are obtained.

Furthermore, the surfaces of both sides of each of the annular glass substrates are polished using a polishing machine, and substrates, that is, glass substrates, of a desired thickness are fabricated. During the polishing, a chemical strengthening treatment using a sodium nitrate solution, a potassium nitrate solution, or the like may be carried out.

The lower limit value of the thickness of each of the glass substrates fabricated by this method is 0.3 mm. This lower limit value is due to the thickness of a component called a carrier that holds the glass substrate when polishing on the polishing machine. The thickness of the carrier can be selected as desired provided that it is greater than or equal to the thickness of each workpiece, namely the glass substrate. However, when the carrier is excessively thin, strength is insufficient and the carrier breaks during polishing. From the perspective of the strength of the carrier, the thickness of the carrier is preferably 0.3 mm or greater. Therefore, the lower limit value of the thickness of each workpiece, namely the glass substrate, is 0.3 mm. Note that a carrier made from a resin such as aramid resin, epoxy resin, or the like is preferably used as the carrier. The carrier may include a fibrous reinforcing material such as carbon fiber, glass fiber, or the like for the purpose of enhancing strength.

Impact Resistance

Figure 4:
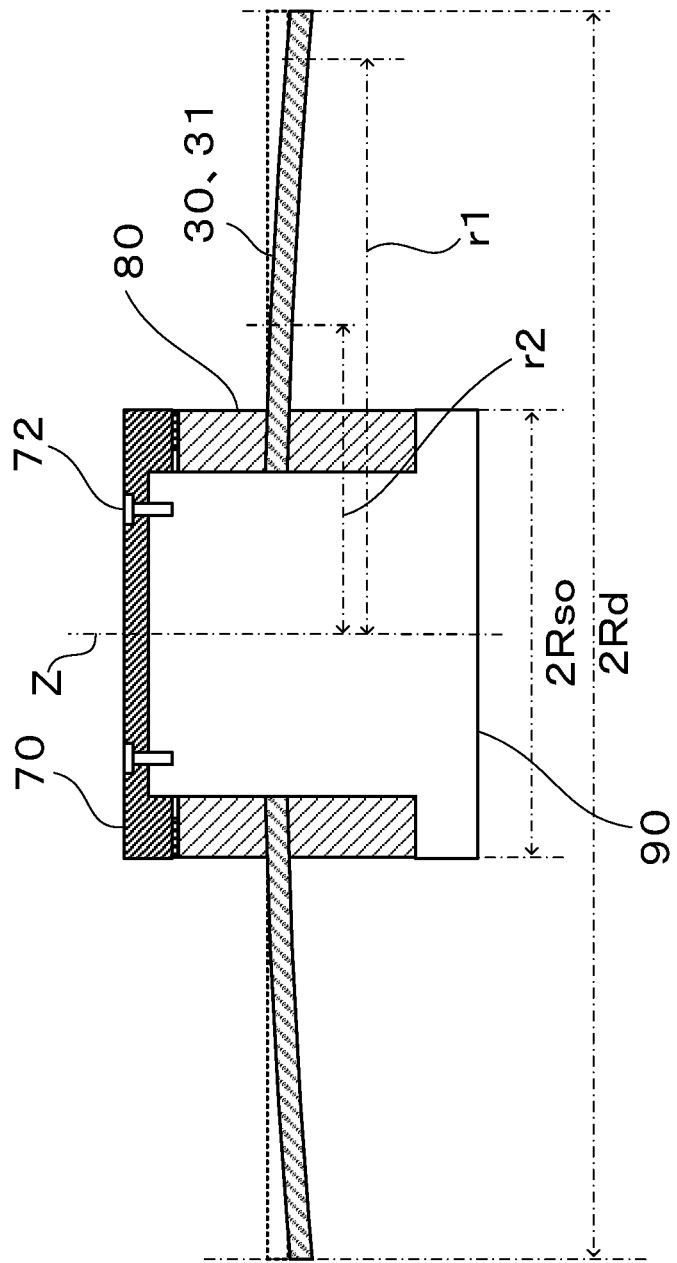
FIG. 4 is a drawing illustrating a case in which an impact is applied to a magnetic disk of the magnetic disk device according to the embodiment.

When the magnetic disk device 100 is subjected to an impact from outside, as illustrated in FIG. 4, the magnetic disks 30 flex, and the magnetic disks 30 collide with the load/unload ramp 60, for example. As described above, the load/unload ramp 60 is a resin component that is mounted at a position closest to the magnetic disks 30 on the outer circumference side of the magnetic disks 30, and is for the purpose of retracting the head 42 when the magnetic disk device 100 is not in operation. When the magnetic disks 30 collide with the load/unload ramp 60, a portion of the load/unload ramp 60 chips off, thus producing foreign matter, scratching the magnetic disks 30, and the like, which causes failures. As the rigidity of the magnetic disks 30 increases, the amount of flexing decreases and the probability of failure decreases. That is, as the rigidity of the magnetic disks 30 increases, the impact resistance increases.

Fluttering Resistance

During operation of the magnetic disk device 100, the magnetic disks 30 rotate at high speed. In one example, the rotation speed is 7200 RPM. When the magnetic disks 30 rotate at high speed, a turbulent flow is generated in the gas inside the device including the magnetic disks 30, and the magnetic disks 30 vibrate. This vibration phenomenon is called fluttering. When the magnetic disks 30 vibrate, the position accuracy of the head 42 decreases, which causes read errors. As the rigidity of the magnetic disks 30 increases, the amount of vibration decreases, and the probability of read errors decreases. That is, as the rigidity of the magnetic disks 30 increases, the fluttering resistance increases. Note that a technique is known for filling the inside of the magnetic disk device 100 with helium instead of air for the purpose of reducing the turbulent flow of gas inside the magnetic disk device 100.

Rigidity of Magnetic Disks

The impact resistance of the magnetic disks 30 is expressed by the magnitude of the amount of flex of the magnetic disks 30 when the magnetic disks 30 are subjected to acceleration caused by impact. The fluttering resistance of the magnetic disks 30 is expressed by the magnitude of the amount of flex of the magnetic disks 30 when the magnetic disks 30 are subjected to the turbulent flow of gas generated by the high speed rotation of the magnetic disks 30. That is, the impact resistance and the fluttering resistance of the magnetic disks 30 are determined by whether the magnetic disks 30 easily flex.

Torque when Tightening Clamp

The clamp 70 is fastened to the hub by the fastening member 72 with a torque of from 5 cN·m to 45 cN·m. It is preferable that a T6 to T8 size hexalobed screw or the like is used as the fastening member 72. Note that a member having a bolt diameter of M2 or the like is used. An upper limit value of the torque when tightening is 45 cN·m, is preferably 40 cN·m, and is more preferably 35 cN·m. When the upper limit value of the torque when tightening is set to these values, the impact resistance of the magnetic disk device 100 can be enhanced. Specifically, when the upper limit value of the torque when tightening is set to these values, it is possible to prevent gaps from forming in a portions of contact sections of the magnetic disks 30 and the spacers 80. When gaps cannot form in portions of the contact sections of the magnetic disks 30 and the spacers 80, deformation of the magnetic disks 30 is prevented even when the magnetic disk device 100 is subjected to an impact from outside, and the impact resistance of the magnetic disk device 100 is excellent. Meanwhile, a lower limit value of the torque when tightening is 5 cN·m, is preferably 20 cN·m, and is more preferably 25 cN·m. When the torque when tightening is set to these values, the magnetic disks 30 and the spacers 80 can be sufficiently fastened. When the lower limit value of the torque when tightening is less than 5 cN·m, the fastening member 72 may loosen.

Ratio of First Contact Length L1 to Second Contact Length L2

The first contact length L1 in the radial direction of the uppermost magnetic disk and the clamp 70 is preferably greater than or equal to one-half of the second contact length L2 in the radial direction of the magnetic disks 30 and the spacers 80. When the first contact length L1/the second contact length L2 is set to one-half or greater, the impact resistance can be enhanced. When the first contact length L1/the second contact length L2 is set to one-half or greater, the contact section of the uppermost magnetic disk and the clamp 70 increases, and gaps between the magnetic disk 30 and the clamp 70 can be reduced. When the gaps are reduced, deformation of the magnetic disks 30 is prevented even when the magnetic disk device 100 is subjected to an impact from outside, and the impact resistance of the magnetic disk device 100 is excellent. Therefore, the first contact length L1/the second contact length L2 is preferably set to one-half or greater, and is more preferably set to 0.9 or greater. From the perspective of impact resistance, it is preferable that the first contact length L1/the second contact length L2 is close to 1.0. However, the weight of the clamp increases as the first contact length L1/the second contact length L2 approaches 1.0 and, as such, an upper limit is preferably set to about 0.95.

Method for Manufacturing Magnetic Disk Device

As illustrated in FIG. 2, in a method for manufacturing the magnetic disk device, in a disposing step, the magnetic disks 30 and the spacers 80 are disposed on the hub 90 and, in a fastening step, the clamp 70 is fastened to the hub 90 by the fastening member 72 with a torque of from 5 cN·m to 45 cN·m. Specifically, in the disposing step, the magnetic disks 30 and the spacers 80 are alternately stacked and disposed on the hub 90. In the fastening step, the clamp 70 is mounted on the hub 90 on which the magnetic disks and the spacers 80 are disposed, and the clamp 70 is fastened to the hub 90 using a hexalobed screw as the fastening member 72. As a result, the magnetic disks 30 and the spacers 80 are fixed to the hub 90. In the fastening step, the upper limit value of the torque when tightening the clamp 70 using the fastening member 72 is, as described above, 45 cN·m, is preferably 40 cN·m, and is more preferably 35 cN·m. Additionally, the lower limit value of the torque is 5 cN·m, is preferably 20 cN·m, and is more preferably 25 cN·m. Note that, in FIG. 1, six fastening members 72 are used, and the torque when tightening is preferably the same for all of the fastening members 72. The tightening torque can, for example, be adjusted using a Kanon idling torque driver manufactured by Nakamura Mfg. Corporation. Additionally, the tightening torque can be measured using, for example, a torque driver manufactured by Tohnichi Mfg. Co.

Thus, according to the magnetic disk device 100 of the present embodiment, the torque when tightening the clamp 70 is appropriately adjusted and, due to this, impact resistance can be enhanced without reducing the recording area. As a result, a 3.5 inch magnetic disk device in which magnetic disks, formed from aluminum alloy substrates and glass substrates that have excellent impact resistance and high data capacity, are mounted can be provided. Additionally, the first contact length L1 in the radial direction of the uppermost magnetic disk 30 and the clamp 70 is greater than or equal to one-half of the second contact length L2 in the radial direction of the magnetic disks 30 and the spacers 80 and, as such, the magnetic disk device 100 can enhance the impact resistance without reducing the recording area. By installing the magnetic disk device 100 in a data center, the capacity of the data center can be increased. Additionally, the concept of the present embodiment that the impact resistance can be enhanced without reducing the recording area by appropriately adjusting the torque when tightening the clamp 70 and by setting the first contact length L1 to one-half of the second contact length L2 or greater is not limited to the 3.5 inch magnetic disk device 100, and can be applied to magnetic disk devices 100 of all sizes. The type of the magnetic disks 30 is not limited to the magnetic disks 30 formed from the aluminum alloy substrate and the glass substrate, and any type of magnetic disks 30 can be used.

Modified Examples

Figure 5:
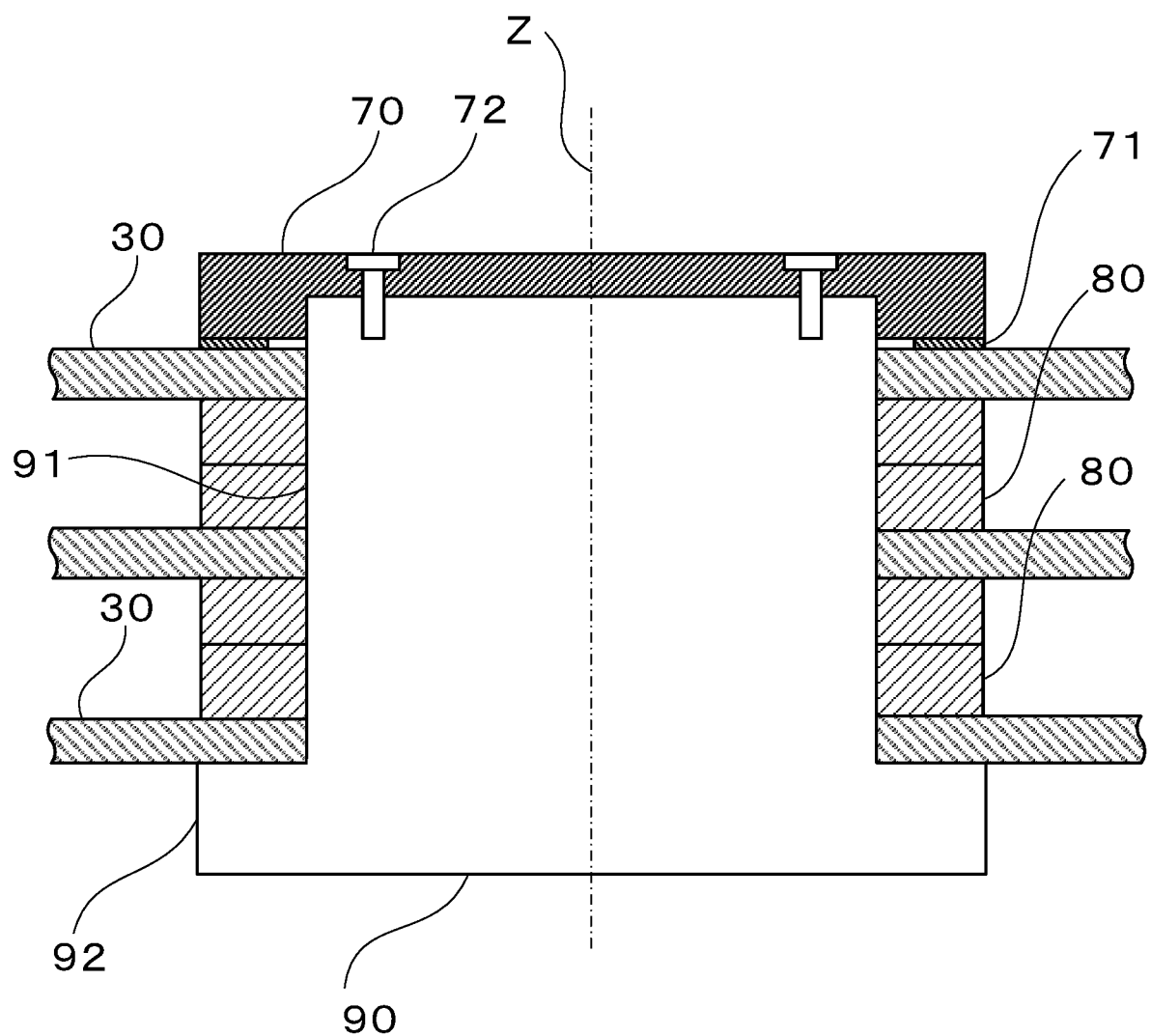
FIG. 5 is an enlarged cross-sectional view illustrating magnetic disks and spacers of a magnetic disk device according to a modified example.
Figure 6:
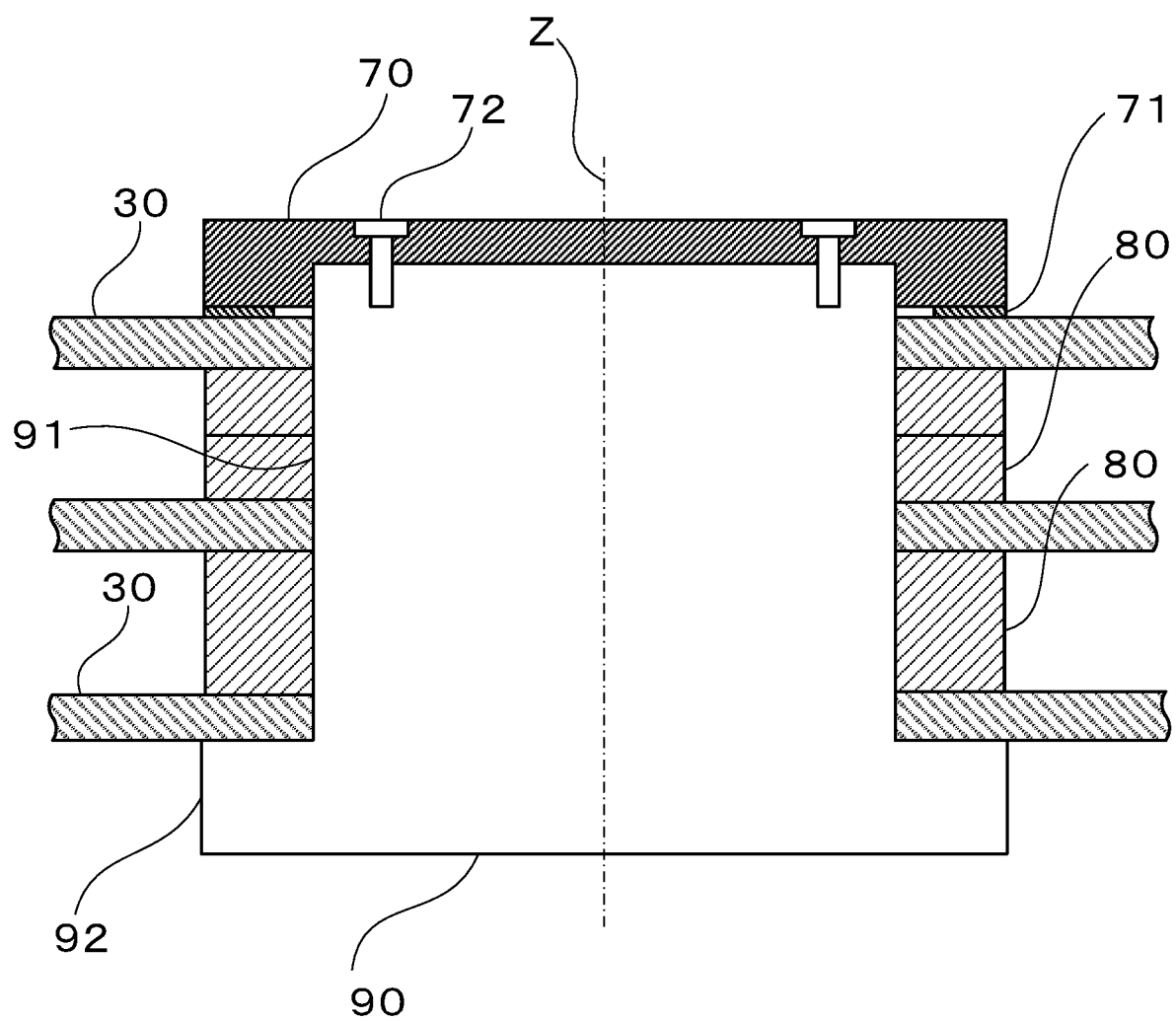
FIG. 6 is an enlarged cross-sectional view illustrating magnetic disks and spacers of a magnetic disk device according to a modified example.

In the embodiment described above, an example is described in which the spacers 80 are disposed, without stacking, between the magnetic disks 30. A configuration is possible in which a plurality of the spacers 80 are stacked and layered, as illustrated in FIG. 5. Typically, one of the spacers 80 is inserted between the magnetic disks 30, but two or more of the spacers 80 can be stacked and layered to enhance the impact resistance. Note that, although it is preferable that a greater number of the spacers 80 are provided, when the number of the spacers 80 is excessive, the number of mounted magnetic disks 30 decreases. As such, the upper limit of the number of the spacers 80 is set to three. Additionally, when, as illustrated in FIG. 6, the number of all of the spacers 80 is set to two or more, the number of mounted magnetic disks 30 decreases. As such, it is preferable that only the spacer 80 that contacts the uppermost magnetic disk 30 (the magnetic disk 30 that contacts the clamp 70) where deformation is likely to be great is set to two or more of the spacers 80. Note that increasing the thickness Ts of each of the spacers 80 is also effective but, in such a case, the design of the spacers 80 must be modified and is impractical. As such, it is preferable to stack and layer a plurality of the spacers 80.

In the embodiments described above, an example is described in which the magnetic disk device 100 is a 3.5 inch magnetic disk device. However, the magnetic disk device 100 may be a device other than a 3.5 inch device. For example, the magnetic disk device 100 may be a 2.5 inch magnetic disk device.

Examples

In the following, the present disclosure is described in further detail using examples, but the present disclosure is not limited to these examples.

Tightening Torque when Fastening Clamp, and Amount of Flex of Magnetic Disks

Plated aluminum alloy substrates having the compositions illustrated in Table 1 and glass substrates having the composition illustrated in Table 2 were fabricated as magnetic disk substrates 31. The substrate size was an inner diameter of 25 mm, an outer diameter of 97 mm, and a thickness of 0.50 mm. Aluminum spacers having an inner diameter of 25 mm, an outer diameter of 32 mm, and a thickness of 1.7 mm were used for the spacers 80. A clamp in which the distance L3 illustrated in FIG. 3 from the center of the fastening member 72 to the center of the protrusion 71 is 5 mm, a hole diameter d1 illustrated in FIG. 3 of the clamp 70 for inserting the fastening member 72 is 2 mm, and the height t1 illustrated in FIG. 3 of the protrusion 71 is 0.2 mm was used as the clamp 70. A T6 size hexalobed screw having a bolt diameter of M2 was used as the fastening member 72.

TABLE 1

| | ALLOY COMPOSITION (MASS %) | | | | | | | | | | | SINGLE SIDE PLATING | TIGHTEN- | RELATIVE VALUE OF MAXIMUM |
| --- | --- | --- | --- | --- | --- | --- | --- | --- | --- | --- | --- | --- | --- | --- |
| | Fe | Mn | Ni | Mg | Zn | Cu | Cr | Zr | Be | Si | Al + UN-AVOIDABLE IMPURITIES | THICK-NESS (μm) | ING TORQUE (cN · m) | AMOUNT OF FLEX (%) |
| EXAMPLE 1 | 0.02 | 0.00 | 0.00 | 4.00 | 0.31 | 0.02 | 0.05 | 0.00 | 0.0002 | 0.02 | BALANCE | 10 | 30 | 96.0 |
| EXAMPLE 2 | 0.02 | 0.00 | 0.00 | 4.00 | 0.31 | 0.02 | 0.05 | 0.00 | 0.0002 | 0.02 | BALANCE | 10 | 40 | 97.5 |
| EXAMPLE 3 | 0.69 | 0.91 | 1.67 | 0.00 | 0.33 | 0.02 | 0.00 | 0.00 | 0.0000 | 0.06 | BALANCE | 5 | 30 | 96.3 |
| EXAMPLE 4 | 0.69 | 0.91 | 1.67 | 0.00 | 0.33 | 0.02 | 0.00 | 0.00 | 0.0000 | 0.06 | BALANCE | 5 | 40 | 98.9 |
| EXAMPLE 5 | 0.69 | 0.91 | 1.67 | 0.00 | 0.33 | 0.02 | 0.00 | 0.00 | 0.0000 | 0.06 | BALANCE | 10 | 30 | 96.2 |
| EXAMPLE 6 | 0.69 | 0.91 | 1.67 | 0.00 | 0.33 | 0.02 | 0.00 | 0.00 | 0.0000 | 0.06 | BALANCE | 10 | 40 | 96.3 |
| EXAMPLE 7 | 0.64 | 0.33 | 1.74 | 1.51 | 0.33 | 0.02 | 0.00 | 0.01 | 0.0000 | 0.06 | BALANCE | 10 | 10 | 99.3 |
| EXAMPLE 8 | 0.64 | 0.33 | 1.74 | 1.51 | 0.33 | 0.02 | 0.00 | 0.01 | 0.0000 | 0.06 | BALANCE | 10 | 30 | 97.3 |
| EXAMPLE 9 | 0.64 | 0.33 | 1.74 | 1.51 | 0.33 | 0.02 | 0.00 | 0.01 | 0.0000 | 0.06 | BALANCE | 10 | 40 | 98.1 |
| COMPARATIVE EXAMPLE 1 | 0.02 | 0.00 | 0.00 | 4.00 | 0.31 | 0.02 | 0.05 | 0.00 | 0.0002 | 0.02 | BALANCE | 10 | 50 | 100 |
| COMPARATIVE EXAMPLE 2 | 0.69 | 0.91 | 1.67 | 0.00 | 0.33 | 0.02 | 0.00 | 0.00 | 0.0000 | 0.06 | BALANCE | 5 | 50 | 100 |
| COMPARATIVE EXAMPLE 3 | 0.69 | 0.91 | 1.67 | 0.00 | 0.33 | 0.02 | 0.00 | 0.00 | 0.0000 | 0.06 | BALANCE | 10 | 50 | 100 |
| COMPARATIVE EXAMPLE 4 | 0.64 | 0.33 | 1.74 | 1.51 | 0.33 | 0.02 | 0.00 | 0.01 | 0.0000 | 0.06 | BALANCE | 10 | 50 | 100 |
| COMPARATIVE EXAMPLE 5 | 0.64 | 0.33 | 1.74 | 1.51 | 0.33 | 0.02 | 0.00 | 0.01 | 0.0000 | 0.06 | BALANCE | 10 | 60 | 101.1 |

TABLE 2

| No. | CHEMICAL COMPOSITION (MASS %) | | | | | | | | | | TIGHTENING TORQUE (cN · m) | RELATIVE VALUE OF MAXIMUM AMOUNT OF FLEX (%) |
| --- | --- | --- | --- | --- | --- | --- | --- | --- | --- | --- | --- | --- |
| | $SiO_2$ | $Al_2O_3$ | $ZrO_2$ | $Na_2O$ | $K_2O$ | MgO | CaO | $TiO_2$ | $Li_2O$ | TRACE ELEMENTS AND UNAVOIDABLE IMPURITIES | | |
| EXAMPLE 10 | 63.0-69.0 | 12.0-18.0 | 0.0-0.5 | 9.0-11.0 | 0.1-0.5 | 0.5-1.5 | 1.0-3.0 | 0.0-0.5 | 3.0-5.0 | BALANCE | 30 | 97.4 |
| EXAMPLE 11 | 63.0-69.0 | 12.0-18.0 | 0.0-0.5 | 9.0-11.0 | 0.1-0.5 | 0.5-1.5 | 1.0-3.0 | 0.0-0.5 | 3.0-5.0 | BALANCE | 40 | 98.3 |
| COMPARATIVE EXAMPLE 6 | 63.0-69.0 | 12.0-18.0 | 0.0-0.5 | 9.0-11.0 | 0.1-0.5 | 0.5-1.5 | 1.0-3.0 | 0.0-0.5 | 3.0-5.0 | BALANCE | 50 | 100 |

Next, as illustrated in FIG. 4, one magnetic disk substrate 31 was fixed on the hub 90 by the spacers 80 and the clamp 70, and these components were installed in an impact testing device. The tightening torque used when fixing the magnetic disk substrate 31 in Examples 1 to 9 and Comparative Examples 1 to 5 is illustrated in Table 1, and the tightening torque used when fixing the magnetic disk substrate 31 in Examples and 11 and Comparative Example 6 is illustrated in Table 2. The tightening torque was adjusted using a Kanon idling torque driver manufactured by Nakamura Mfg. Corporation. The torque was measured using a torque driver manufactured by Tohnichi Mfg. Co. The amount of flex caused by impact of an outer circumferential position (a distance r1 from a substrate center: 44.2 mm) of the magnetic disk substrate 31 and an inner circumferential position (a distance r2 from the substrate center: 23 mm) of the magnetic disk substrate 31 was measured by a capacitive distance sensor by applying an impact at an acceleration of 55 to 60 G and an action time of 2.7 to 3.0 ms.

A difference between the outer circumferential position and the inner circumferential position ([amount of flex of outer circumferential position]−[amount of flex of inner circumferential position]) was calculated, and a value obtained by dividing the maximum value of the absolute value by the acceleration ([maximum value of absolute value of difference between amounts of flex]/[acceleration], hereinafter referred to as "maximum amount of flex") was calculated. The measuring was performed one time for each sample. Then, a relative value of the maximum amount of flex of each tightening torque of Examples 1 to 11, which have the same composition, was calculated with the maximum amount of flex of Comparative Examples 1 to 4, and 6, in which the tightening torque is 50 cN·m, set to 100%. The relative value of the maximum amount of flex was calculated on the basis of Comparative Example 1 for Examples 1 and 2, Comparative Example 2 for Examples 3 and 4, Comparative Example 3 for Examples 5 and 6, Comparative Example 4 for Examples 7 to 9, and Comparative Example 6 for Examples 10 and 11. The relative value of the maximum amount of flex of Comparative Example 5 was calculated with the maximum amount of flex of Comparative Example 4 set to 100%. In Comparative Example 5, the tightening torque was 60 cN·m and, as such, the relative value of the maximum amount of flex was greater than in Comparative Example 4 in which the tightening torque was 50 cN·m. The relative value of the maximum amount of flex calculated in the manner described above is illustrated in Tables 1 and 2. Tables 1 and 2 indicate that the tightening torque of Examples 1 to 11 is from 10 to 40 cN·m, and the relative value of the maximum amount of flex of Examples 1 to 11 is less than 100% relative to the corresponding Comparative Examples 1 to 4, and 6. Thus, it was found that, when the tightening torque is from 10 to 40 cN·m, the relative value of the maximum amount of flex is less than when the tightening torque is 50 cN·m.

Next, aluminum alloy substrates having the composition illustrated in Table 3 were fabricated as the magnetic disk substrate 31. The substrate size was an inner diameter of 25 mm, an outer diameter of 97 mm, and a thickness of 0.35 mm. The thickness of the prepared substrate was different from that of the aluminum alloy substrates of Table 1. The spacers 80 of Examples 12 and 13 and Comparative Example 7 were aluminum spacers having an inner diameter of 25 mm, an outer diameter of 32 mm, and a thickness of 1.7 mm; the spacers 80 of Examples 14 and 15 and Comparative Example 8 were aluminum spacers having an inner diameter of 25 mm, an outer diameter of 32 mm, and a thickness of 1.6 mm; and the spacers 80 of Examples 16 to 18 and Comparative Examples 9 and 10 were aluminum spacers having an inner diameter of 25 mm, an outer diameter of 33 mm, and a thickness of 1.8 mm. As illustrated in FIG. 3, clamp in which the distance L3 from the center of the fastening member 72 to the center of the protrusion 71 was 5 mm, the hole diameter d1 of the clamp 70 for inserting the fastening member 72 was 2 mm, and the height t1 of the protrusion 71 was 0.2 mm was used as the clamp 70. A hexalobed screw having a bolt diameter of M2 and a size of T6 was used as the fastening member 72.

TABLE 3

| | ALLOY COMPOSITION (MASS %) | | | | | | | | | | | SPACER THICKNESS (mm) | TIGHTENING TORQUE (cN · m) | RELATIVE VALUE OF MAXIMUM AMOUNT OF FLEX (%) |
|---|---|---|---|---|---|---|---|---|---|---|---|---|---|---|
| | Fe | Mn | Ni | Mg | Zn | Cu | Cr | Zr | Be | Si | Al + UN- AVOIDABLE IMPURITIES | | | |
| EXAMPLE 12 | 0.02 | 0.00 | 0.00 | 4.00 | 0.31 | 0.02 | 0.05 | 0.00 | 0.0002 | 0.02 | BALANCE | 1.7 | 30 | 94.9 |
| EXAMPLE 13 | 0.02 | 0.00 | 0.00 | 4.00 | 0.31 | 0.02 | 0.05 | 0.00 | 0.0002 | 0.02 | BALANCE | 1.7 | 40 | 97.8 |
| EXAMPLE 14 | 0.02 | 0.00 | 0.00 | 4.00 | 0.31 | 0.02 | 0.05 | 0.00 | 0.0002 | 0.02 | BALANCE | 1.6 | 30 | 98.2 |
| EXAMPLE 15 | 0.02 | 0.00 | 0.00 | 4.00 | 0.31 | 0.02 | 0.05 | 0.00 | 0.0002 | 0.02 | BALANCE | 1.6 | 40 | 99.0 |
| EXAMPLE 16 | 0.02 | 0.00 | 0.00 | 4.00 | 0.31 | 0.02 | 0.05 | 0.00 | 0.0002 | 0.02 | BALANCE | 1.8 | 10 | 99.9 |
| EXAMPLE 17 | 0.02 | 0.00 | 0.00 | 4.00 | 0.31 | 0.02 | 0.05 | 0.00 | 0.0002 | 0.02 | BALANCE | 1.8 | 30 | 98.2 |
| EXAMPLE 18 | 0.02 | 0.00 | 0.00 | 4.00 | 0.31 | 0.02 | 0.05 | 0.00 | 0.0002 | 0.02 | BALANCE | 1.8 | 40 | 99.2 |
| COMPARATIVE EXAMPLE 7 | 0.02 | 0.00 | 0.00 | 4.00 | 0.31 | 0.02 | 0.05 | 0.00 | 0.0002 | 0.02 | BALANCE | 1.7 | 50 | 100 |
| COMPARATIVE EXAMPLE 8 | 0.02 | 0.00 | 0.00 | 4.00 | 0.31 | 0.02 | 0.05 | 0.00 | 0.0002 | 0.02 | BALANCE | 1.6 | 50 | 100 |
| COMPARATIVE EXAMPLE 9 | 0.02 | 0.00 | 0.00 | 4.00 | 0.31 | 0.02 | 0.05 | 0.00 | 0.0002 | 0.02 | BALANCE | 1.8 | 50 | 100 |
| COMPARATIVE EXAMPLE 10 | 0.02 | 0.00 | 0.00 | 4.00 | 0.31 | 0.02 | 0.05 | 0.00 | 0.0002 | 0.02 | BALANCE | 1.8 | 60 | 101.9 |

Next, as illustrated in FIG. 4, the magnetic disk substrate 31 was fixed on the hub 90 by the spacer 80 and the clamp 70, and these components were installed in an impact testing device. The tightening torque used when fixing the magnetic disk substrate 31 in Examples 12 to 18 and Comparative Examples 7 to 10 is illustrated in Table 3. The tightening torque was adjusted using a Kanon idling torque driver manufactured by Nakamura Mfg. Corporation. The torque was measured using a torque driver manufactured by Tohnichi Mfg. Co. Additionally, an amount of flex caused by impact of an outer circumferential position (the distance r1 from the substrate center: 44.2 mm) of the magnetic disk substrate 31 and an inner circumferential position (the distance r2 from the substrate center: 23 mm) of the magnetic disk substrate 31 was measured by a capacitive distance sensor by applying an impact at an acceleration of 31 to 33 G and an action time of 3.6 to 3.85 ms.

A difference between the outer circumferential position and the inner circumferential position ([amount of flex of outer circumferential position]–[amount of flex of inner circumferential position]) was calculated, and a value obtained by dividing the maximum value of the absolute value by the acceleration ([maximum value of absolute value of difference between amounts of flex]/[acceleration], hereinafter referred to as "maximum amount of flex") was calculated. The measuring was performed one time for each sample. Then, a relative value of the maximum amount of flex of each tightening torque of Examples 12 to 18 was calculated with the maximum amount of flex of Comparative Examples 7 to 9, in which the tightening torque is 50 cN·m, set to 100%. The relative value of the maximum amount of flex was calculated on the basis of Comparative Example 7 for Examples 12 and 13, Comparative Example 8 for Examples 14 and 15, and Comparative Example 9 for Examples 16 to 18. The relative value of the maximum amount of flex of Comparative Example 10 was calculated with the maximum amount of flex of Comparative Example 9 set to 100%. In Comparative Example 10, the tightening torque was 60 cN·m and, as such, the relative value of the maximum amount of flex was greater than in Comparative Example 9 in which the tightening torque was 50 cN·m. Thus, it was found that, when the tightening torque is from 10 to 40 cN·m, the relative value of the maximum amount of flex is less than when the tightening torque is 50 cN·m.

Next, aluminum alloy substrates having the composition illustrated in Table 4 and glass substrates having the composition illustrated in Table 5 were fabricated as the magnetic disk substrate 31. The substrate size of the aluminum alloy substrate was an inner diameter of 25 mm, an outer diameter of 95 mm, and a thickness of 0.635 mm; and the substrate size of the glass substrate was an inner diameter of 25 mm, an outer diameter of 97 mm, and a thickness of 0.5 mm. Aluminum spacers having an inner diameter of 25 mm, an outer diameter of 32 mm, and a thickness of 1.6 mm were used for the spacers 80. As illustrated in FIG. 3, clamp in which the distance L3 from the center of the fastening member 72 to the center of the protrusion 71 was 5 mm, the hole diameter d1 of the clamp 70 for inserting the fastening member 72 was 2 mm, and the height t1 of the protrusion 71 was 0.2 mm was used as the clamp 70. A hexalobed screw having a bolt diameter of M2 and a size of T6 was used as the fastening member 72.

TABLE 4

| | ALLOY COMPOSITION (MASS %) | | | | | | | | | | | TIGHTENING TORQUE (cN · m) | RELATIVE VALUE OF MAXIMUM AMOUNT OF FLEX (%) |
|---|---|---|---|---|---|---|---|---|---|---|---|---|---|
| | Fe | Mn | Ni | Mg | Zn | Cu | Cr | Zr | Be | Si | Al + UNAVOIDABLE IMPURITIES | | |
| EXAMPLE 19 | 0.02 | 0.00 | 0.00 | 4.00 | 0.31 | 0.02 | 0.05 | 0.00 | 0.0002 | 0.02 | BALANCE | 30 | 95.4 |
| EXAMPLE 20 | 0.02 | 0.00 | 0.00 | 4.00 | 0.31 | 0.02 | 0.05 | 0.00 | 0.0002 | 0.02 | BALANCE | 40 | 97.4 |

TABLE 4-continued

| | ALLOY COMPOSITION (MASS %) | | | | | | | | | | TIGHTENING TORQUE (cN · m) | RELATIVE VALUE OF MAXIMUM AMOUNT OF FLEX (%) |
|---|---|---|---|---|---|---|---|---|---|---|---|---|
| | Fe | Mn | Ni | Mg | Zn | Cu | Cr | Zr | Be | Si | Al + UNAVOIDABLE IMPURITIES | | |
| COMPARATIVE EXAMPLE 11 | 0.02 | 0.00 | 0.00 | 4.00 | 0.31 | 0.02 | 0.05 | 0.00 | 0.0002 | 0.02 | BALANCE | 50 | 100 |

TABLE 5

| No. | CHEMICAL COMPOSITION (MASS %) | | | | | | | | | | TIGHTENING TORQUE (cN · m) | RELATIVE VALUE OF MAXIMUM AMOUNT OF FLEX (%) |
|---|---|---|---|---|---|---|---|---|---|---|---|---|
| | $SiO_2$ | $Al_2O_3$ | $ZrO_2$ | $Na_2O$ | $K_2O$ | MgO | CaO | $TiO_2$ | $Li_2O$ | TRACE ELEMENTS AND UNAVOIDABLE IMPURITIES | | |
| EXAMPLE 21 | 52.0-58.0 | 21.0-27.0 | 0.0-0.5 | 0.5-1.5 | 0.0-0.5 | 5.0-7.0 | 7.0-10.0 | 0.5-1.5 | 1.0-3.0 | BALANCE | 30 | 97.9 |
| EXAMPLE 22 | 52.0-58.0 | 21.0-27.0 | 0.0-0.5 | 0.5-1.5 | 0.0-0.5 | 5.0-7.0 | 7.0-10.0 | 0.5-1.5 | 1.0-3.0 | BALANCE | 40 | 99.2 |
| COMPARATIVE EXAMPLE 12 | 52.0-58.0 | 21.0-27.0 | 0.0-0.5 | 0.5-1.5 | 0.0-0.5 | 5.0-7.0 | 7.0-10.0 | 0.5-1.5 | 1.0-3.0 | BALANCE | 50 | 100 |

Next, as illustrated in FIG. 4, the magnetic disk substrate 31 was fixed on the hub 90 by the spacers 80 and the clamp 70, and these components were installed in an impact testing device. The tightening torque used when fixing the magnetic disk substrate 31 in Examples 19 and 20 and Comparative Example 11 is illustrated in Table 4, and the tightening torque used when fixing the magnetic disk substrate 31 in Examples 21 and 22 and Comparative Example 12 is illustrated in Table 5. The tightening torque was adjusted using a Kanon idling torque driver manufactured by Nakamura Mfg. Corporation. The torque was measured using a torque driver manufactured by Tohnichi Mfg. Co. The amount of flex caused by impact of the outer circumferential position (the distance r1 from the substrate center: 44.2 mm) of the magnetic disk substrate 31 and the inner circumferential position (the distance r2 from the substrate center: 23 mm) of the magnetic disk substrate 31 was measured by a capacitive distance sensor by applying an impact at an acceleration of 51 to 56 G and an action time of 2.7 to 3.0 ms.

The difference between the outer circumferential position and the inner circumferential position ([amount of flex of outer circumferential position]−[amount of flex of inner circumferential position]) was calculated, and the value obtained by dividing the maximum value of the absolute value by the acceleration ([maximum value of absolute value of difference between amounts of flex]/[acceleration], hereinafter referred to as "maximum amount of flex") was calculated. The measuring was performed one time for each sample. Then, the relative value of the maximum amount of flex of each tightening torque of Examples 19 to 22 was calculated with the maximum amount of flex of Comparative Examples 11 and 12, in which the tightening torque is 50 cN·m, set to 100%. The relative value of the maximum amount of flex was calculated on the basis of Comparative Example 11 for Examples 19 and 20, and Comparative Example 12 for Examples 21 and 22. Thus, it was found that, when the tightening torque is from 30 to 40 cN·m, the relative value of the maximum amount of flex is less than when the tightening torque is 50 cN·m.

Note that, when the maximum amount of flex of the magnetic disk substrate 31 caused by the impact is great, the components in the magnetic disk device collide with the load/unload ramp, for example, and a portion of the load/unload ramp chips off, thus producing foreign matter, scratching the magnetic disks, and the like, which causes failures. The impact resistance increases as the maximum amount of flex of the magnetic disk substrate 31 decreases.

Ratio of First Contact Length L1 to Second Contact Length L2

Next, with the tightening torque set to 40 cN·m, L1/L2 was varied as illustrated in Tables 6 and 7 and the magnetic disk substrate 31 was fixed on the hub 90 by the spacers 80 and the clamp 70. These components were installed in the same impact testing device as described above and subjected to the same testing. Then, with the maximum amount of flex of Comparative Examples 13 to 15, in which L1/L2 is 0.06, set to 100%, the relative value of the maximum amount of flex of Examples 23 to 25 in which L1/L2 is 1.00 was calculated. The relative value of the maximum amount of flex was calculated on the basis of Comparative Example 13 for Example 23, Comparative Example 14 for Example 24, and Comparative Example 15 for Example 25. The compositions of Examples 23 to 25 were the same as the compositions of the corresponding Comparative Examples 13 to 15. The relative value of the maximum amount of flex calculated in the manner described above is illustrated in Tables 6 and 7. Tables 6 and 7 indicate that the relative value of the maximum amount of flex of Examples 23 to 25 is less than 100% relative to the corresponding Comparative Examples 13 to 15. The relative value of the maximum amount of flex of Examples 23 to 25 in which L1/L2 is 1.00 is less than the relative value of the maximum amount of flex of Comparative Examples 13 to 15 in which L1/L2 is 0.06 and, thus, it is understood that the impact resistance of Examples 23 to 25 is excellent.

TABLE 6

| No. | ALLOY COMPOSITION (MASS %) | | | | | | | | | | Al + UNAVOIDABLE IMPURITIES | SINGLE SIDE PLATING THICKNESS (μm) | L1/L2 | RELATIVE VALUE OF MAXIMUM AMOUNT OF FLEX (%) |
|---|---|---|---|---|---|---|---|---|---|---|---|---|---|---|
| | Fe | Mn | Ni | Mg | Zn | Cu | Cr | Zr | Be | Si | | | | |
| EXAMPLE 23 | 0.02 | 0.00 | 0.00 | 4.00 | 0.31 | 0.02 | 0.05 | 0.00 | 0.0002 | 0.02 | BALANCE | 10 | 1.00 | 96.2 |
| EXAMPLE 24 | 0.64 | 0.33 | 1.74 | 1.51 | 0.33 | 0.02 | 0.00 | 0.01 | 0.0000 | 0.06 | BALANCE | 10 | 1.00 | 95.1 |
| COMPARATIVE EXAMPLE 13 | 0.02 | 0.00 | 0.00 | 4.00 | 0.31 | 0.02 | 0.05 | 0.00 | 0.0002 | 0.02 | BALANCE | 10 | 0.06 | 100 |
| COMPARATIVE EXAMPLE 14 | 0.64 | 0.33 | 1.74 | 1.51 | 0.33 | 0.02 | 0.00 | 0.01 | 0.0000 | 0.06 | BALANCE | 10 | 0.06 | 100 |

TABLE 7

| No. | CHEMICAL COMPOSITION (MASS %) | | | | | | | | | TRACE ELEMENTS AND UNAVOIDABLE IMPURITIES | L1/L2 | RELATIVE VALUE OF MAXIMUM AMOUNT OF FLEX (%) |
|---|---|---|---|---|---|---|---|---|---|---|---|---|
| | $SiO_2$ | $Al_2O_3$ | $ZrO_2$ | $Na_2O$ | $K_2O$ | MgO | CaO | $TiO_2$ | $Li_2O$ | | | |
| EXAMPLE 25 | 52.0-58.0 | 21.0-27.0 | 0.0-0.5 | 0.5-1.5 | 0.0-0.5 | 5.0-7.0 | 7.0-10.0 | 0.5-1.5 | 1.0-3.0 | BALANCE | 1.00 | 94.9 |
| COMPARATIVE EXAMPLE 15 | 52.0-58.0 | 21.0-27.0 | 0.0-0.5 | 0.5-1.5 | 0.0-0.5 | 5.0-7.0 | 7.0-10.0 | 0.5-1.5 | 1.0-3.0 | BALANCE | 0.06 | 100 |

Number of Spacers

As illustrated in Tables 8 and 9, with the tightening torque set to 40 cN·m and L1/L2 set to 1.00, the number of spacers 80 was varied and the magnetic disk substrate 31 was fixed on the hub 90 by the spacers 80 and the clamp 70. These components were installed in the same impact testing device as described above and subjected to the same testing. Then, with the maximum amount of flex of Comparative Examples 16 to 18, in which one spacer 80 was provided, set to 100%, the relative value of the maximum amount of flex of Examples 26 to 28 in which two spacers 80 are provided was calculated. The relative value of the maximum amount of flex was calculated on the basis of Comparative Example 16 for Example 26, Comparative Example 17 for Example 27, and Comparative Example 18 for Example 28. The compositions of Examples 26 to 28 were the same as the compositions of the corresponding Comparative Examples 16 to 18. The relative value of the maximum amount of flex calculated in the manner described above is illustrated in Tables 8 and 9. Tables 8 and 9 indicate that the relative value of the maximum amount of flex of Examples 26 to 28 in which two spacers 80 are provided is less than 100% relative to the corresponding Comparative Examples 16 to 18 in which one spacer 80 is provided and, thus, it is understood that the impact resistance of Examples 26 to 28 is excellent.

TABLE 8

| No. | ALLOY COMPOSITION (MASS %) | | | | | | | | | | Al + UNAVOIDABLE IMPURITIES | SINGLE SIDE PLATING THICKNESS (μm) | NUMBER OF SPACERS | RELATIVE VALUE OF MAXIMUM AMOUNT OF FLEX (%) |
|---|---|---|---|---|---|---|---|---|---|---|---|---|---|---|
| | Fe | Mn | Ni | Mg | Zn | Cu | Cr | Zr | Be | Si | | | | |
| EXAMPLE 26 | 0.02 | 0.00 | 0.00 | 4.00 | 0.31 | 0.02 | 0.05 | 0.00 | 0.0002 | 0.02 | BALANCE | 10 | 2 | 98.9 |
| EXAMPLE 27 | 0.64 | 0.33 | 1.74 | 1.51 | 0.33 | 0.02 | 0.00 | 0.01 | 0.0000 | 0.06 | BALANCE | 10 | 2 | 95.4 |
| COMPARATIVE EXAMPLE 16 | 0.02 | 0.00 | 0.00 | 4.00 | 0.31 | 0.02 | 0.05 | 0.00 | 0.0002 | 0.02 | BALANCE | 10 | 1 | 100 |
| COMPARATIVE EXAMPLE 17 | 0.64 | 0.33 | 1.74 | 1.51 | 0.33 | 0.02 | 0.00 | 0.01 | 0.0000 | 0.06 | BALANCE | 10 | 1 | 100 |

TABLE 9

| No. | CHEMICAL COMPOSITION (MASS %) | | | | | | | | | | NUMBER OF SPACERS | RELATIVE VALUE OF MAXIMUM AMOUNT OF FLEX (%) |
| --- | --- | --- | --- | --- | --- | --- | --- | --- | --- | --- | --- | --- |
| | $SiO_2$ | $Al_2O_3$ | $ZrO_2$ | $Na_2O$ | $K_2O$ | $MgO$ | $CaO$ | $TiO_2$ | $Li_2O$ | TRACE ELEMENTS AND UNAVOIDABLE IMPURITIES | | |
| EXAMPLE 28 | 52.0-58.0 | 21.0-27.0 | 0.0-0.5 | 0.5-1.5 | 0.0-0.5 | 5.0-7.0 | 7.0-10.0 | 0.5-1.5 | 1.0-3.0 | BALANCE | 2 | 98.5 |
| COMPARATIVE EXAMPLE 18 | 52.0-58.0 | 21.0-27.0 | 0.0-0.5 | 0.5-1.5 | 0.0-0.5 | 5.0-7.0 | 7.0-10.0 | 0.5-1.5 | 1.0-3.0 | BALANCE | 1 | 100 |

As described above, setting the tightening torque used when fastening the clamp 70 to the values described above makes it possible to enhance the impact resistance while leaving the thickness of the magnetic disk substrate 31 as-is. This was demonstrated in the Examples described above that used the aluminum alloy substrate and the glass substrate having thicknesses of 0.35 mm, 0.50 mm, and 0.635 mm, and outer diameters of 95 mm and 97 mm; and the spacers having thicknesses of 1.6 mm, 1.7 mm, and 1.8 mm, and outer diameters of 32 mm and 33 mm. Additionally, setting the ratio of the first contact length L1 to the second contact length L2 to the values described above makes it possible to enhance the impact resistance while leaving the tightening torque and the thickness of the magnetic disk substrate 31 as-is. Moreover, setting the number of spacers 80 to two makes it possible it enhance the impact resistance while leaving the tightening torque, L1/L2, and the thickness of the magnetic disk substrate 31 as-is. Note that the magnetic disk substrate 31 differs from the magnetic disks 30 in that the magnetic disk substrate 31 does not include the magnetic layer and the like, but is thought to be equivalent to the magnetic disks 30 with regards to impact resistance and the like. Accordingly, it is understood that, by setting the tightening torque and L1/L2 to the values described above, or by setting the number of spacers 80 to two, a magnetic disk device can be provided that has excellent impact resistance and high data capacity.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2021-046121, filed on Mar. 19, 2021, the entire disclosure of which is incorporated by reference herein.

REFERENCE SIGNS LIST

10 Housing
20 Base
30 Magnetic disk
31 Magnetic disk substrate
40 Head stack assembly
41 Arm
42 Head
50 Voice coil motor
60 Load/unload ramp
70 Clamp
71 Protrusion
72 Fastening member
80 Spacer
90 Hub
91 Small diameter section
92 Large diameter section
100 Magnetic disk device
D Depth
W Width
H Height
N Number
Z Rotational axis
Rd Outer radius
Td, Ts Thickness
T Stacked height
Rsi Inner radius
Rso Outer radius

The invention claimed is:

1. A magnetic disk device comprising:
    a plurality of disk-shaped magnetic disks, each including a through-hole in a center section thereof;
    a spacer that is disposed among the magnetic disks and that includes a through-hole in a center section thereof;
    a hub inserted into the through-holes of the magnetic disks and the spacer;
    a clamp having a disk body portion, an annular flange portion having a distal surface and extending from the disk body portion, and a protrusion extending from the distal surface of the annular flange portion, the protrusion having a planar surface pressing and holding the magnetic disks and the spacer; and
    a plurality of fastening members, each fastening member of the plurality of fastening members fastening the clamp to the hub,
    wherein the clamp is fastened to the hub by the plurality of fastening members with a torque of from 5 cN·m to 45 cN·m; and
    a first contact length in a radial direction and defined by the planar surface between a first magnetic disk of the plurality of magnetic disks and the clamp is greater than or equal to ½ a second contact length in the radial direction and defined by contacting surfaces between the first magnetic disk of the plurality of magnetic disks and the spacer.

2. The magnetic disk device according to claim 1, wherein the clamp is fastened to the hub by the plurality of fastening members with a torque of from 20 cN·m to 45 cN·m.

3. The magnetic disk device according to claim 1, wherein the clamp is fastened to the hub by the plurality of fastening members with a torque of from 20 cN·m to 35 cN·m.

4. The magnetic disk device according to claim 1, wherein each of the magnetic disks has a size of an inner diameter of 25 mm, an outer diameter of from 95 mm to 97 mm, and a thickness of 0.35 mm to 0.635 mm, the spacer has a size of an inner diameter of 25 mm, an outer diameter of from 32 mm to 33 mm, and a thickness of from 1.6 mm to 1.8 mm, and a distance from a center of each fastening member of the plurality of fastening members to a protrusion center provided on the clamp is 5 mm.

5. The magnetic disk device according to claim 1, wherein a plurality of spacers is stacked and layered between the magnetic disks.

6. The magnetic disk device according to claim 1, wherein a plurality of spacers is stacked and layered between a magnetic disk, of the magnetic disks, contacting the clamp and a magnetic disk adjacent to the magnetic disk.

7. The magnetic disk device according to claim 1, wherein each of the magnetic disks has a thickness of 0.48 mm or less.

8. The magnetic disk device according to claim 1, wherein each of the magnetic disks has a thickness of 0.36 mm or less.

9. A method for manufacturing a magnetic disk device including a plurality of disk-shaped magnetic disks, each including a through-hole in a center section thereof, a spacer that is disposed among the magnetic disks and that includes a through-hole in a center section thereof, a hub inserted into the through-holes of the magnetic disks and the spacer, a clamp having a disk body portion, an annular flange portion having a distal surface and extending from the disk body portion, and a protrusion extending from the distal surface of the annular flange portion, the protrusion having a planar surface pressing and holding the magnetic disks and the spacer, the planar surface of the protrusion contacting a first magnetic disk of the plurality of magnetic disks and extending parallel to the first magnetic disk of the plurality of magnetic disks when the clamp is fastened to the hub, and a plurality of fastening members, each fastening member of the plurality of fastening members fastening the clamp to the hub, the method comprising:

fastening the clamp to the hub by the plurality of fastening members with a torque of from 5 cN·m to 45 cN·m.

10. A magnetic disk device comprising:

a plurality of disk-shaped magnetic disks, each including a through-hole in a center section thereof;

a spacer that is disposed among the magnetic disks and that includes a through-hole in a center section thereof;

a hub inserted into the through-holes of the magnetic disks and the spacer;

a clamp pressing and holding the magnetic disks and the spacer, the clamp having a disk body portion, an annular flange portion having a distal surface and extending from the disk body portion, and a protrusion extending from the distal surface of the annular flange portion, the protrusion having a planar surface for contacting a magnetic disk of the plurality of disk-shaped magnetic disks; and a fastening member that fastens the clamp to the hub, wherein the clamp is fastened to the hub by the fastening member with a torque of from 5 cN·m to 45 cN·m; and wherein the planar surface of the protrusion contacts a first magnetic disk of the plurality of magnetic disks and extends parallel to the first magnetic disk of the plurality of magnetic disks when the clamp is fastened to the hub.

11. The magnetic disk device according to claim 10, wherein the protrusion defines a gap between the clamp and the magnetic disk of the plurality of magnetic disks at an inner circumference of the clamp.

* * * * *